United States Patent [19]
Turner et al.

[11] 3,912,097
[45] Oct. 14, 1975

[54] VEHICLE TRANSPORT LOADING AND SERVICING MEANS

[75] Inventors: Leland D. Turner, East Peoria, Ill.; William H. Zimmerman, Phoenix, Ariz.

[73] Assignee: Caterpillar Tractor Company, Peoria, Ill.

[22] Filed: Dec. 13, 1974

[21] Appl. No.: 532,559

[52] U.S. Cl................................ 214/152; 180/9.5
[51] Int. Cl.²......................................... B62D 55/06
[58] Field of Search............. 214/38 R, 131 A, 152; 180/9.48, 9.5; 305/16

[56] References Cited
UNITED STATES PATENTS
| | | | |
|---|---|---|---|
| 2,846,094 | 8/1958 | Pilch | 214/131 |
| 3,696,870 | 10/1972 | Terai | 180/9.48 |

*Primary Examiner*—Philip Goodman
*Attorney, Agent, or Firm*—Phillips, Moore, Weissenberger Lempio & Strabala

[57] ABSTRACT

A vehicle includes forward and rearward cylinders for normally actuating forward and rearward respective implements. Upon removal of such implements, forward and rearward generally horizontal beams are attached to the cylinders, and support horses or the like are positioned to support these beams at their outer ends, so that extension of these cylinders raises the vehicle for service and/or removal of the track roller frames. Upon removal of such track roller frames, a flat bed transport vehicle can be driven under the raised tractor chassis, whereupon the cylinders may be retracted to lower the chassis onto the transport vehicle. The chassis is then secured to the transport vehicle, and the beams are removed and transported with the chassis for use in the removal of the chassis from the transport vehicle upon arrival at its destination.

13 Claims, 3 Drawing Figures

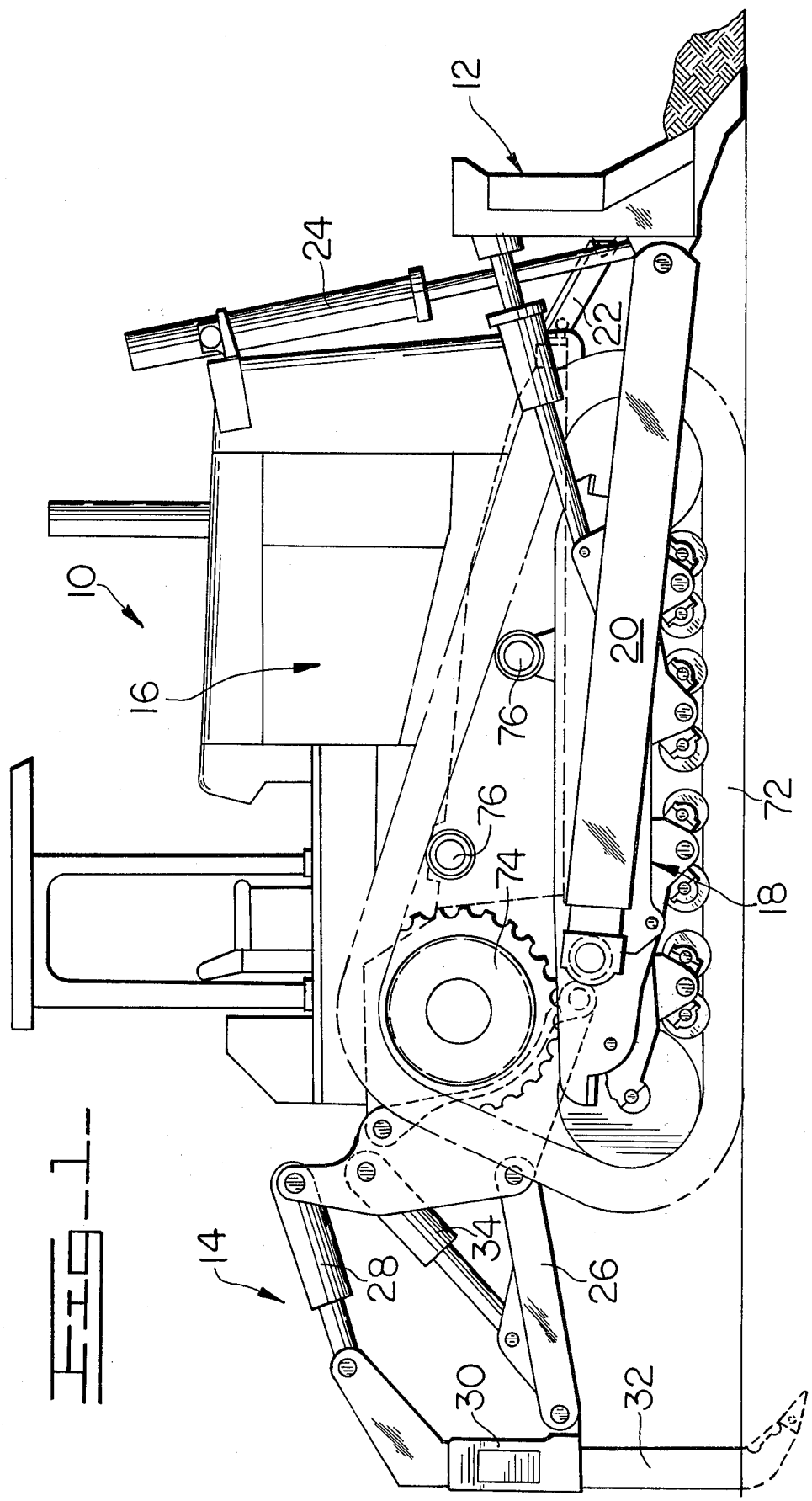

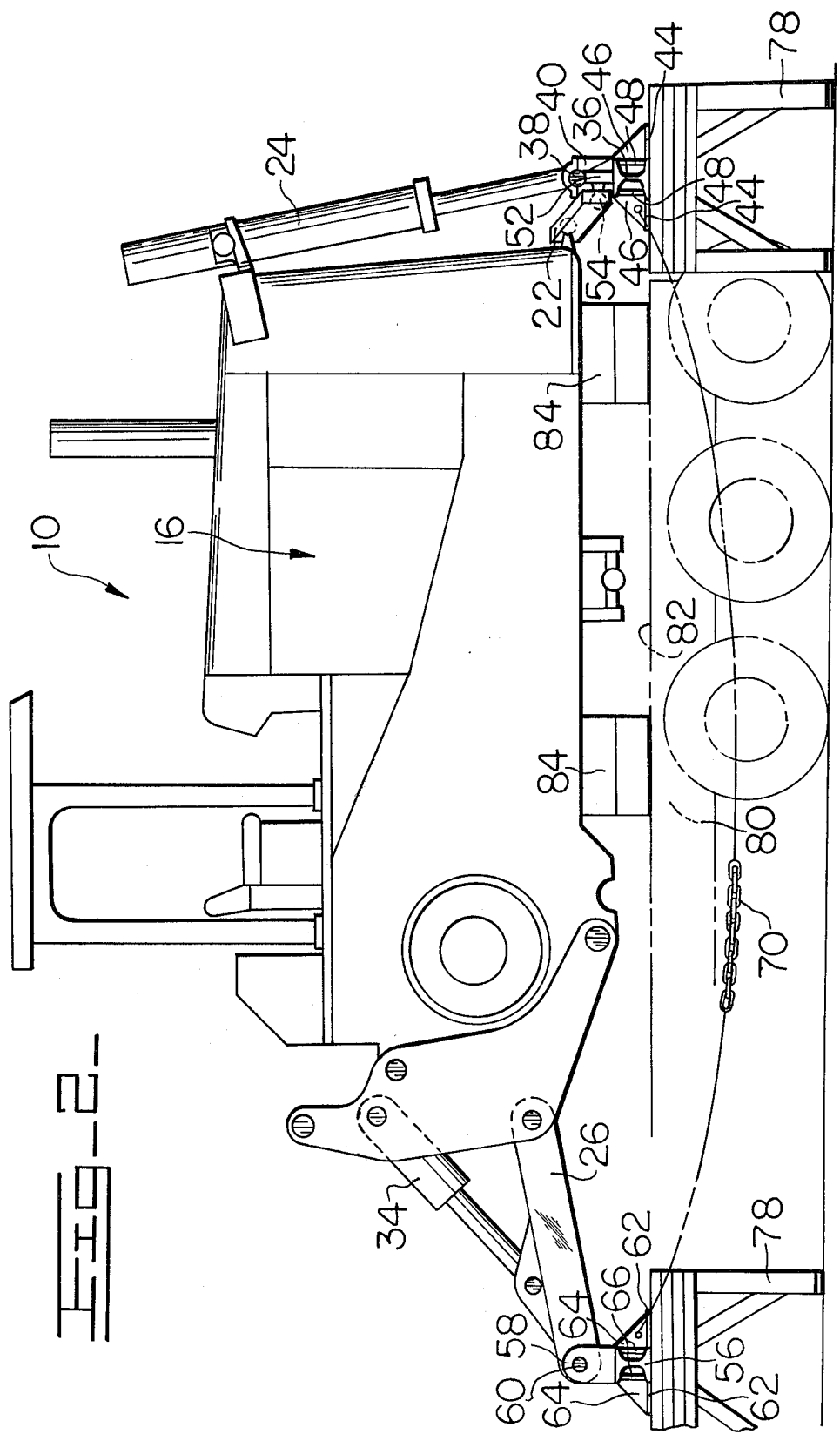

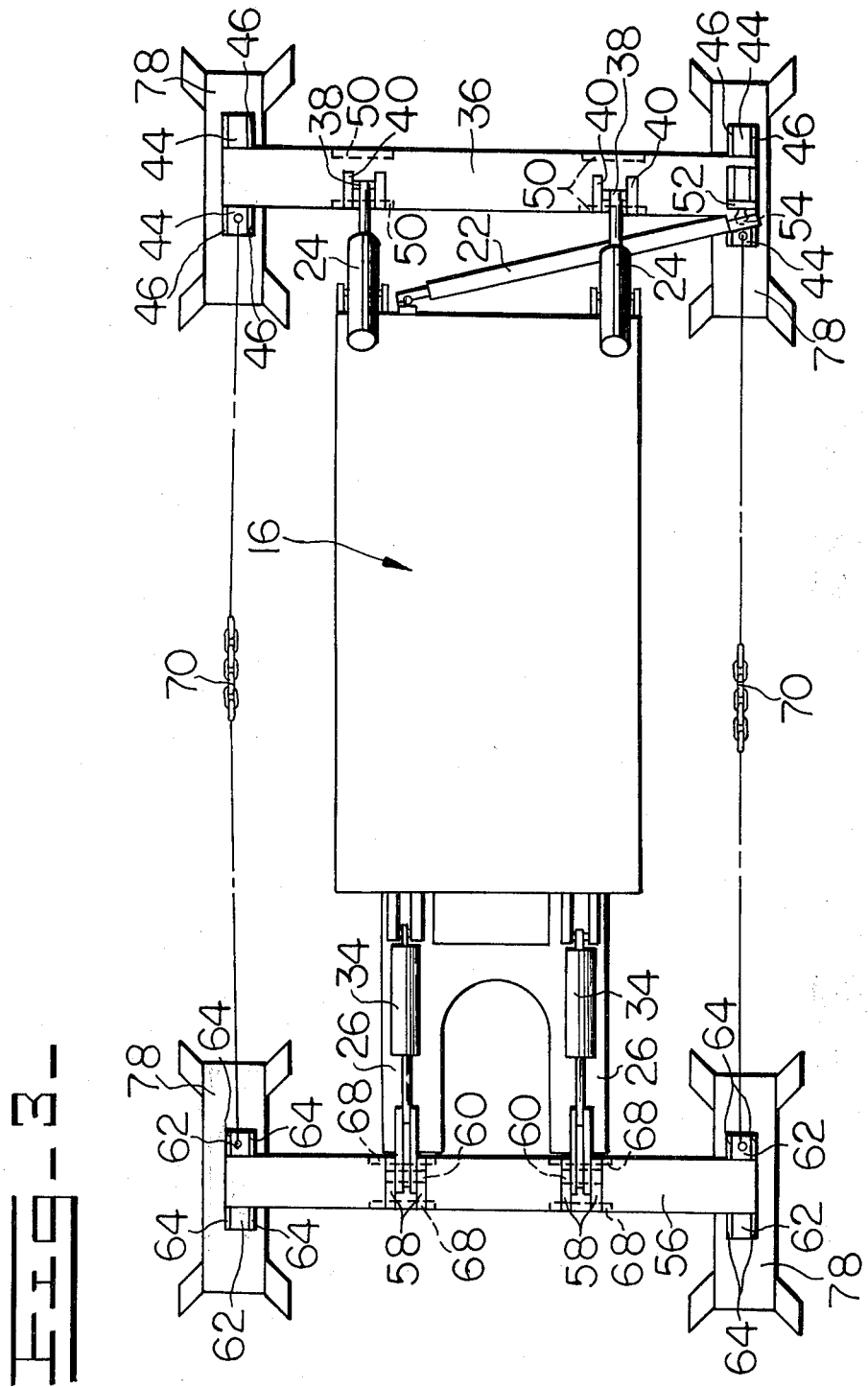

VEHICLE TRANSPORT LOADING AND SERVICING MEANS

BACKGROUND OF THE INVENTION

This invention relates to the servicing and transport of large and heavy vehicles, and more particularly, to servicing and transport means which are to be used in cooperation with operating cylinders for implements of the vehicle.

U.S. Pat. No. 3,696,879 to Terai, et al. discloses a system of lifting the chassis of a vehicle through actuation of hydraulic cylinders, to allow track portions thereof to be removed from the chassis of the vehicle. A trailer may then be disposed below the chassis, and the chassis may be placed thereon. While such a system may be relatively effective in operation, it is to be noted that at one end of the vehicle, an implement is actually brought into contact with the ground, and great vertical force is placed thereon in order to lift such one end of the vehicle. The present invention seeks to overcome such a difficulty by providing particular advantageous structure for use in combination with actuatable cylinders, wherein the problems resulting from the placing of great lifting forces on the implements of the vehicle are avoided.

SUMMARY OF THE INVENTION

It is accordingly an object of this invention to provide apparatus which is capable of effective use in combination with a vehicle for allowing proper and convenient servicing and transport of the vehicle.

It is a further object of this invention to provide apparatus which, while fulfilling the above object, avoids the problems encountered in utilizing the implements of the vehicle for the handling (i.e., the lifting) of such vehicle.

It is a still further object of this invention to provide a particular method of handling a vehicle in an extremely efficient and effective manner, for the servicing and transport thereof.

Broadly stated, the invention comprises a support arrangement for a chassis of a vehicle comprising first extendable and retractable means mounted to the chassis adjacent one end thereof. A first generally horizontally disposed beam is operably associated with the first extendable and retractable means, and is movable relative to the chassis upon extension and retraction of the first extendable and retractable means. Further included are second extendable and retractable means mounted to the chassis adjacent the other end thereof, and a second generally horizontally disposed beam operably associated with the second extendable and retractable means and movable relative to the chassis upon extension and retraction of the second extendable and retractable means. Further included are support means positioned under the first and second beams, the first and second extendable and retractable means being positioned so that actuation of the first extendable and retractable means in one direction and actuation of the second extendable and retractable means in one direction move the chassis generally vertically in one direction, and actuation of the first extendable and retractable means in the other direction and actuation of the second extendable and retractable means in the other direction moves the chassis generally vertically in the other direction.

Broadly stated, the invention also comprises a method of handling a vehicle, the vehicle having a chassis, front cylinder means for operating a first implement, and rear cylinder means for operating a second implement. Such method comprises removing the first implement from the front cylinder means, removing the second implement from the rear cylinder means, attaching a generally horizontally disposed first beam relative to the front cylinder means for movement relative to the chassis upon extension and retraction of the first cylinder means, attaching a generally horizontally disposed beam relative to the rear cylinder means for movement relative to the chassis upon extension and retraction of the second cylinder means, providing support means beneath the first and second beams, and actuating the front and rear cylinder means to lift the chassis of the vehicle generally vertically.

BRIEF DESCRIPTION OF THE DRAWINGS

These and other objects of the invention will become apparent from a study of the following specification and drawings, in which:

FIG. 1 is a side elevational view of a vehicle having attached bulldozer blade and ripper;

FIG. 2 is a side elevation view similar to that shown in FIG. 1, but incorporating the invention; and FIG. 3 is a plan schematic view of the vehicle of FIG. 2, incorporating the invention.

DESCRIPTION OF THE PREFERRED EMBODIMENT

Shown in FIG. 1 is a vehicle in the form of a tractor 10 having a front end attached implement in the form of a bulldozer blade 12, and a rear attached implement in the form of a parallelogram-type ripper 14. The vehicle 10 includes a main chassis 16, which has pivotally fixed thereto track roller frames 18 and push arms 20. The bulldozer blade 12 is pivotally attached to the forward ends of the push arms 20, and a support brace 22 is disposed generally laterally of the chassis 16 and is pivotally connected to the front of the chassis 16 and the back of the blade 12, to provide lateral support for the blade 12. Extendable and retractable cylinders 24 are pivotally mounted relative to the chassis 16 adjacent the forward end thereof, and have their rod ends extending downwardly to pivotally connect with the blade 12. It will be seen that extension and retraction of the cylinders 24 pivots the push arms 20 so that the blade 12 may be lowered and raised.

The ripper 14 includes a pair of lower interconnected links 26 pivotally attached to the chassis 16 and extending rearwardly therefrom, a pair of upper shank cylinders 28 which act as upper links of the parallelogram linkage, a shank support beam 30 pivotally connected to the extended ends of the lower link 26, and a ripping implement 32 associated with the support beam 30, and connected to the upper shank cylinders 24. Lift cylinders 34 pivotally interconnect the chassis 16 and the lower links 26, so that extension and retraction of such cylinders 34 lowers and raises the ripping implement 32. Extension and retraction of the upper shank cylinders 28 tilts the ripping implement 32 to a chosen attitude.

Due to the very great weight and size of such vehicle 10, such vehicle 10 cannot be transported in an assembled state due to limitations of the transport vehicle and various state roading regulations.

Initially, in the handling of such vehicle 10, the bulldozer blade 12 and push arms 20 are removed, and a horizontally disposed H-beam 36 is pivotally attached at 38 by upwardly extending bracket 40 on the beam 36 and pinned to the rod ends of the bulldozer lift cylinders 24 of the vehicle 10. The outer ends of the beam 36 have shoes 44 welded to the lower surface of such beam 36, with the shoes 44 stiffened by gussets 46 welded to the shoes 44 and to plates 48 which themselves are welded between the legs of the beam 36. Stiffening plates 50 are also welded between the legs of beam 36 immediately below the brackets 40 for strengthening purposes. An upwardly extending bracket 52 is welded to the right end of the beam 36 and strengthened by gussets 54. Such bracket 52 has a ball 54 fixed thereto, and the brace 22, again disposed generally laterally of the chassis 16, is pivotally connected relative to the chassis 16 and pivotally connected relative to the beam 36 for providing lateral stability of the beam 36.

The shank support beam 30 of the ripper assembly 14 is removed, as are the cylinders 28, and a horizontally disposed H-beam 56 is pivotally attached by upwardly extending brackets 58 fixed to the beam 56 and pins 10, to the lower links 26. The beam 56 is constructed in a manner similar to the beam 36, having its outer end shoes 62 stiffened by gussets 64 welded to the shoes 62 and to plates 66 welded between the legs of the beam 56. Stiffening plates 68 are welded between the legs of the beam 56 below the brackets 58 for strengthening purposes.

It will be seen that one end of each cylinder 24 is pivotally connected relative to the chassis 16, and the other end of each cylinder 24 is pivotally connected relative to the beam 36. Likewise, one end of each cylinder 34 is pivotally connected relative to the chassis 16, and the other end of each is pivotally connected relative to the beam 56. It will also be seen that extension of the cylinders 24 moves the beam 36 downwardly relative to the chassis 16, and retraction of the cylinders 24 moves the beam 36 upwardly relative to the chassis 16. Likewise, extension of the cylinders 34 lowers the beam 56 relative to the chassis 16, and retraction of the cylinders 34 raises the beam 56 relative to the chassis 16.

Chains 70 are disposed on either side of the vehicle chassis 16, and one end of each chain 70 is fixed relative to the beam 36, and the other end is fixed relative to the beam 56. It will be seen that upon full extension of the chains 70, movement of the beam 36 upon pivoting of the cylinders 24 relative to the chassis 16 away from the chassis 16 will be effectively limited.

To further prepare the large and heavy vehicle 10 for transport, the tracks 72 are disconnected and disengaged from the drive sprockets and laid forward and rearward of the tractor 10 on the ground. The final drives 74 are removed along with the track carrier rollers 76 attached to the sides of the chassis 16. Horses 78 or other similar support means are positioned under the beams 36, 56, under the shoes 44, 62 of the beams 36, 56, and the cylinders 24, 34 are then actuated to extend, to raise the chassis 16 of the vehicle 10 generally vertically to allow the tracks 72 to be pulled either forward or rearward clear of the vehicle 10. The cylinders 24, 34 are then actuated to retract, to lower the chassis 16, to bring the track roller frames 18 into contact with the ground. The roller frames 18 are then disconnected from the chassis 16. The cylinders 24, 34 are again actuated to extend, lifting the chassis 16 generally vertically away from the track roller frames 18. The track roller frames 18 are then removed by pulling them forward from under the chassis 16. A transport truck shown by broken lines 80 in FIG. 2 is placed and positioned beneath the raised chassis 16, and the cylinders 24, 34 are then actuated to retract, to lower the chasis 16 onto the platform 82 of the truck 80. The chassis 16 is then appropriately supported by blocks 84 and secured to the platform 82 for transport. The beams 36, 56 are removed from the cylinders 24, and the links 26, during transport, since their width would exceed normal roading width limitations. Since the track roller frames 18 are quite heavy, they would normally be shipped separately from the vehicle chassis 16. The beams 36, 56 would normally accompany the vehicle 10 to its destination, where the reverse of the above procedure would occur to assemble the vehicle 10.

As can be seen from the above, the extremely large and heavy tractor vehicle can be disassembled to an extent and loaded on a transport vehicle without the aid of an extremely large crane or hoist. The above could clearly be accomplished in remote locations. It will also be seen that the system of lifting described above can be used to raise the vehicle 10 as required for service of the chassis, tracks, the undercarriage or the like.

What is claimed is:

1. Support arrangement for a chassis of a vehicle comprising:
    first extendable and retractable means mounted to the chassis adjacent one end thereof;
    a first generally horizontally disposed beam operably associated with the first extendable and retractable means, and movable relative to chassis upon extension and retraction of the first extendable and retractable means;
    second extendable and retractable means mounted to the chassis adjacent the other end thereof;
    a second generally horizontally disposed beam operably associated with the second extendable and retractable means and movable relative to the chassis upon extension and retraction of the second extendable and retractable means; and
    support means positioned under the first and second beams, the first and second extendable and retractable means being positioned so that actuation of the first extendable and retractable means in one direction and actuation of the second extendable and retractable means in one direction moves the chassis generally vertically in one direction, and actuation of the first extendable and retractable means in the other direction and actuation of the second extendable and retractable means in the other direction moves the chassis generally vertically in the other direction.

2. The support arrangement of claim 1 and further comprising a brace disposed generally laterally of the chassis and interconnecting the chassis and first beam for providing lateral stability of the first beam.

3. The support arrangement of claim 2 wherein the first extendable and retractable means comprise first cylinder means one end of which is pivotally connected relative to the chassis and the other end which is pivotally connected relative to the first beam.

4. The support arrangement of claim 3 wherein the brace is pivotally mounted relative to the chassis and pivotally mounted relative to the first beam, and further comprising means for limiting movement of the first beam upon pivoting of the first cylinder means relative to the chassis away from the chassis.

5. The support arrangement of claim 4 wherein the means for limiting movement of the first beam upon pivoting of the first cylinder means relative to the chassis away from the chassis comprise chain means one end of which is fixed relative to the first beam and the other end of which is fixed relative to the second beam, full extension of the chain means so limiting such movement of the first beam upon pivoting of the first cylinder means relative to the chassis away from the chassis.

6. The support arrangement of claim 1 wherein the second extendable and retractable means comprise second cylinder means, and further comprising link means one end of which is pivotally connected relative to the chassis and the other end of which is pivotally connected relative to the second beam, and wherein the second cylinder means has one end pivotally connected relative to the chassis and the other end connected relative to the link means.

7. The support arrangement of claim 4 wherein the second extendable and retractable means comprise second cylinder means, and further comprising link means one end of which is pivotally connected relative to the chassis and the other end of which is pivotally connected relative to the second beam, and wherein the second cylinder means has one end pivotally connected relative to the chassis and the other end pivotally connected relative to the link means.

8. The support arrangement of claim 1 wherein the first extendable and retractable means comprise first cylinder means one end of which is pivotally connected relative to the chassis and the other end of which is pivotally connected relative to the first beam, and further comprising means for limiting movement of the first beam upon pivoting of the first cylinder means relative to the chassis away from the chassis.

9. The support arrangement of claim 8 wherein the means for limiting movement of the first beam upon pivoting of the first cylinder means relative to the chassis away from the chassis comprise chain means one end of which is fixed relative to the second beam, full extension of the chain means so limiting such movement of the first beam upon pivoting of the first cylinder means relative to the chassis away from the chassis.

10. A method of handling a vehicle, said vehicle having a chassis, front cylinder means for operating a first implement, and rear cylinder means for operating a second implement, said method comprising:
  removing said first implement from the front cylinder means;
  removing said second implement from the rear cylinder means;
  attaching a generally horizontally disposed first beam relative to the front cylinder means for movement relative to the chassis upon extension and retraction of the first cylinder means;
  attaching a generally horizontally disposed second beam relative to the front cylinder means for movement relative to the chassis upon extension and retraction of the second cylinder means;
  providing support means beneath the first and second beams; and
  actuating the front and rear cylinder means to lift the chassis of the vehicle generally vertically.

11. The method of claim 10 and comprising the step of pivotally attaching a generally lateral brace relative to the chassis and the first beam prior to the actuation of the front and rear cylinders to lift the chassis, for providing lateral support of the first beam.

12. The method of claim 11 wherein the vehicle includes drive track means, comprising track roller frame means and track means operatively connected with the track roller frame means, and further comprising the steps of:
  removing the track means from the track roller frame means upon the actuation of the front and rear cylinder means to lift the chassis of the vehicle generally vertically;
  actuating the front and rear cylinder means to bring the track roller frame means into contact with the ground; and
  disconnecting the track roller frame from the chassis; and actuating the front and rear cylinder means to lift the chassis generally vertically from the track roller frame means.

13. The method of claim 12 and further comprising the steps of:
  removing the disconnected track roller frame means from beneath the chassis;
  placing transport platform means beneath the chassis; and
  actuating the front and rear cylinder means to lower the chassis onto the transport platform means.

* * * * *